United States Patent
Milne

[11] 4,025,693
[45] May 24, 1977

[54] ANTI-FOULING MARINE COMPOSITIONS

[75] Inventor: Alexander Milne, Newcastle upon Tyne, England

[73] Assignee: The International Paint Co., Ltd., London, England

[22] Filed: Dec. 17, 1975

[21] Appl. No.: 641,780

[30] Foreign Application Priority Data

Jan. 20, 1975 United Kingdom ............... 2291/75

[52] U.S. Cl. .............. 428/447; 106/15 R; 428/907
[51] Int. Cl.² ...................... C09D 5/14; C09D 5/16
[58] Field of Search .......... 428/447, 907; 106/15 R

[56] References Cited
UNITED STATES PATENTS

| | | | |
|---|---|---|---|
| 2,986,474 | 5/1961 | Robbart | 428/447 |
| 3,197,314 | 7/1965 | Gross | 106/15 R |
| 3,202,542 | 8/1965 | Poje | 428/447 |
| 3,214,280 | 10/1965 | Taylor | 106/15 R |
| 3,337,352 | 8/1967 | Sano et al. | 106/15 R |
| 3,347,686 | 10/1967 | Weil et al. | 106/15 R |
| 3,497,990 | 3/1970 | Jeffries | 428/907 X |
| 3,702,778 | 11/1972 | Mueller et al. | 428/447 |
| 3,794,501 | 2/1974 | Denio | 106/15 R |
| 3,912,519 | 10/1975 | Takagi et al. | 106/15 R |

*Primary Examiner*—Harold Ansher
*Attorney, Agent, or Firm*—Davis Hoxie Faithfull & Hapgood

[57] ABSTRACT

A marine surface having a coating comprising a silicone rubber-silicone oil mixture produced by cold-curing an oligomeric silicone rubber having hydroxyl end groups in the presence of a silicone oil. The coating acts as an anti-fouling composition to prevent or reduce accumulation of organisms such as barnacles, algae and the like on the marine surface during prolonged exposure to sea-water.

4 Claims, No Drawings

ANTI-FOULING MARINE COMPOSITIONS

This invention relates to anti-fouling compositions for application to surfaces such as ship's bottoms, buoys and pier supports which are exposed to sea-water. Such surfaces will hereinafter be referred to generally as "marine surfaces".

It is known to apply coatings of anti-fouling compositions to marine surfaces so as to prevent or reduce to accumulation of organisms such as barnacles, algae and the like on the surfaces. Generally speaking, such compositions contain one or more toxic compounds such as organo-metallic compounds which have a poisoning effect on the organisms. It has, however, been proposed in Kroyer's British patent specification No. 1,307,001 to apply to marine surfaces a coating comprising a vulcanised silicone rubber which is substantially free from toxic compounds.

In accordance with this invention a marine surface has a coating comprising a silicone rubber - silicone oil mixture produced by cold-curing an oligomeric silicone rubber having hydroxyl end groups in the presence of a silicone oil. The coating of the invention has an anti-fouling effect, preventing or reducing the accumulation of organisms such as barnacles, algae and the like on the marine surface during prolonged exposure to sea-water. The silicone rubber-silicone oil coating of the invention may be the only anti-fouling coating on the marine surface or it may be a top coating on top of a standard coating of an anti-fouling composition containing a toxic compound, for example a toxic organo-metallic compound.

Silicone polymers are polymers built up on a repeated — Si — O — backbone with repeating chains as follows

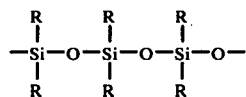

in which R represents an alkyl, aryl or vinyl group, the two groups R attached to the same silicon atom being identical or different. The art distinguishes three types of polymer, depending mainly on the molecular weight, namely:

1. Silicone oils, otherwise known as silicone fluids;
2. Silicone rubbers, sometimes referred to as silicone elastomers or silicone gums, and
3. Silicone resins.

Silicone oils generally have molecular weights in the range of 2,000 to 30,000 with viscosities ranging from 20 to 1,000 centistokes. Silicone rubbers generally have molecular weights in the range of 40,000 to 100,000 with viscosities ranging from 10 to 1,000 stokes.

In the present invention, the coating essentially comprises a silicone from each of types 1 and 2 with the proviso that type 2 is a cold-cured silicone rubber in which the end groups are both hydroxyl groups. This type of silicone rubber can be represented by the formula

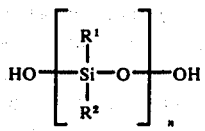

in which $n$ is an integer and $R^1$ and $R^2$ are identical or different alkyl, aryl or vinyl groups.

We have found that particularly useful compositions according to the invention contain silicone oils in which one R in the above formula is an alkyl group, preferably a methyl group, and the other R is an aryl group, preferably a phenyl group. Thus methyl phenyl silicone oils are preferred. The oligomeric silicone rubber used is a room-temperature curing (RTV) rubber and this may be a dialkyl silicone rubber or an alkyl, aryl silicone rubber, preferably a methyl phenyl silicone rubber, provided that it is hydroxy terminated.

The coating compositions used according to the invention preferably contain 1 to 10 parts by weight of silicone oil per 100 parts by weight of silicone rubber. When a catalyst such as dibutyl tin dilaurate, stannous octoate or a platinum salt is incorporated to cure the oligomeric hydroxy-terminated silicone rubber, it is preferably added in the usual proportions, for example about 1 per cent based on the weight of the silicone rubber. The coating composition may also contain one or more customary pigments for the production of coloured compositions, for example for use on yachts.

The coating composition used according to the invention may be applied to the marine surface in the absence of a solvent provided that the paint viscosity is acceptable; otherwise, a solvent such as toluene or white spirit may be added in sufficient quantity to produce a paint of acceptable viscosity. The thickness of the coating film applied to the marine surface is not critical; films ranging from 12.5 $\mu$ to 1000 $\mu$ thickness have performed well. The marine surface will normally be shot-blasted and/or primed with anti-corrosive paints before the coating is applied according to normal practice.

The coating compositions are allowed to cure at room temperature after application to the marine surfaces.

The present invention is illustrated by the following Examples in which parts are by weight.

EXAMPLE 1

In this Example, the oligomeric silicone rubber used was the room-temperature vulcanisable silicone rubber Silicoset 105 which is a hydroxyl-terminated methyl phenyl silicone rubber sold by Imperial Chemical Industries Limited and the silicone oil used was DC 550, a methyl phenyl silicone oil sold by Dow Corning Limited.

An anti-fouling metal panel was coated with a 250 $\mu$ thick layer of composition consisting of

| | |
|---|---|
| Silicoset 105 | 100 parts |
| Dibutyl tin laurate (catalyst) | 1 part |
| DC 550 | 5 parts. |

After the coating had been allowed to cure at room-temperature, the panel was immersed in sea-water and examined after 14 and 23 weeks' immersion respectively. In both cases the anti-fouling rating after hosing the surface was 100 indicating complete absence of organisms on the coated panel. The panel in fact showed little sign of anti-fouling after 2½ years' immersion. A control panel similarly coated with cured Silicoset 105 and catalyst, but without the DC 550 showed signs of organic build-up after 14 weeks' immersion.

EXAMPLE 2

A composition consisting of:

| | | |
|---|---|---|
| Silicoset 105 | 95 | parts |
| Dibutyl tin dilaurate | 1 | part |
| DC 550 | 5 | parts | was applied as a coating 250 $\mu$ thick to a patch area of the underside of an ocean-going trading vessel and then allowed to cure at room temperature. After 16½ months' continuous regular trading the patch was found to be clean except for slight slime only.

This composition can be extended with up to 20 parts of toluene if desired to assist in its application to marine surfaces.

EXAMPLE 3

A pigmented composition suitable for application to the bottom of yachts is as follows:

| | | |
|---|---|---|
| Silicoset 105 | 45.00 | parts |
| DC 550 | 2.25 | parts |
| Iron oxide | 16.00 | parts |
| Aerosil | 1.80 | parts |
| White spirit | 25.03 | parts |
| Catalyst mixture | | |
| Dibutyl tin laurate | 0.475 | part |
| Stannous octoate | 0.025 | part |
| White spirit | 13.40 | parts |

EXAMPLE 4

An alternative pigmented composition is as follows:

| | | |
|---|---|---|
| Silicoset 105 | 56 | parts |
| DC 550 | 3 | parts |
| Aerosil | 2 | parts |
| Titanium dioxide | 4 | parts |
| Phthalocyanine Blue | 2 | parts |
| Phthalocyanine Green | 2 | parts |
| White Spirit | 31 | parts |
| Catalyst mixture | | |
| Dibutyl tin dilaurate | 0.6 | part |
| Stannous octoate | 0.03 | part |
| White spirit | 17.60 | parts |

The Silicoset 105 used in the Examples may be replaced by the Midland Silicones product Cold-cure Silastomer 9161 which is also a hydroxyl-terminated silicone rubber; this can be cured as in the Examples or using a platinum salt catalyst.

What is claimed is:

1. A marine surface having a coating comprising a silicone rubber-silicone oil mixture produced by cold-curing an oligomeric silicone rubber having hydroxyl end groups in the presence of a silicone oil, said coating being substantially free from silicone resin.

2. A marine surface as claimed in claim 1 in which the silicone oil is a methyl phenyl silicone oil.

3. A marine surface as claimed in claim 1 in which the silicone rubber is a methyl phenyl silicone rubber.

4. A marine surface as claimed in claim 1 in which the coating contains from 1 to 10 parts by weight of silicone oil per 100 parts by weight of silicone rubber.

* * * * *